(12) United States Patent
Chen

(10) Patent No.: US 8,443,703 B2
(45) Date of Patent: May 21, 2013

(54) WIRELESS TRANSMISSION TORQUE WRENCH WITH ANGULAR ORIENTATION CORRECTION

(75) Inventor: Chiang Kao Chen, Taipei Hsien (TW)

(73) Assignee: Lifestyle Products Corp., Taipei (TW)

( * ) Notice: Subject to any disclaimer, the term of this patent is extended or adjusted under 35 U.S.C. 154(b) by 186 days.

(21) Appl. No.: 13/017,246

(22) Filed: Jan. 31, 2011

(65) Prior Publication Data

US 2012/0006161 A1 Jan. 12, 2012

(30) Foreign Application Priority Data

Jul. 12, 2010 (TW) ................................ 99213271 U

(51) Int. Cl.
*B25B 23/14* (2006.01)
*G01L 5/24* (2006.01)
*B25B 23/142* (2006.01)

(52) U.S. Cl.
CPC ............... *B25B 23/1425* (2013.01); *G01L 5/24* (2013.01)
USPC .......................................... 81/479; 73/862.23

(58) Field of Classification Search
CPC .... B25B 23/14; B25B 23/142; B25B 23/1422; B25B 23/1425; B25B 23/1427; G01L 5/24
USPC .................... 81/467, 479; 73/862.21–862.26
See application file for complete search history.

(56) References Cited

U.S. PATENT DOCUMENTS

| | | | |
|---|---|---|---|
| 6,167,788 B1 * | 1/2001 | Schonberger et al. | 81/467 |
| 7,311,025 B1 * | 12/2007 | Wilson, Jr. | 81/429 |
| 7,469,619 B2 * | 12/2008 | Anjanappa et al. | 81/479 |
| 8,171,828 B2 * | 5/2012 | Duvan et al. | 81/479 |
| 8,234,936 B2 * | 8/2012 | Nakata et al. | 73/862.26 |
| 8,264,374 B2 * | 9/2012 | Obatake et al. | 340/870.4 |
| 2009/0241743 A1 * | 10/2009 | Hsieh | 81/467 |
| 2010/0170369 A1 * | 7/2010 | Yokoyama et al. | 81/467 |
| 2010/0170370 A1 * | 7/2010 | Yokoyama et al. | 81/479 |
| 2010/0265097 A1 * | 10/2010 | Obatake et al. | 340/870.4 |
| 2011/0132157 A1 * | 6/2011 | Duvan et al. | 81/479 |
| 2011/0162493 A1 * | 7/2011 | Anjanappa et al. | 81/479 |
| 2011/0185863 A1 * | 8/2011 | Hsieh | 81/479 |
| 2011/0303054 A1 * | 12/2011 | Cattaneo | 81/479 |

* cited by examiner

*Primary Examiner* — David B Thomas
(74) *Attorney, Agent, or Firm* — Rosenberg, Klein & Lee

(57) ABSTRACT

Disclosed is a torque wrench with wireless transmission function, including at least one wrench body having an end to which a tool head is coupled for coupling with a tool piece, such as wrench socket, for application of torque, at least one toque-strain bar, which is coupled to the tool head of the wrench body, at least one torque sensor, which is mounted to the toque-strain bar to detect the value of the torque transmitted to the toque-strain bar, at least one angular position sensor, which is set inside the wrench body to detect a horizontal angle of the body and the tool head, at least one detection and processing circuit, which is arranged in the wrench body and connected to the torque sensor and the angular position sensor to convert detected torque and angle into digital torque and angle data for displaying or issuing an alarm and to transmit the torque and angle data in a bi-directional wireless manner, and at least one control receiver, which receives the torque and angle data from the detection and processing circuit for subsequent applications.

25 Claims, 10 Drawing Sheets

WIRELESS TRANSMISSION TORQUE WRENCH WITH ANGULAR ORIENTATION CORRECTION

BACKGROUND OF THE INVENTION

1. Field of the Invention

The present invention relates to a wireless transmission torque wrench with angular orientation correction, and in particular to a torque wrench that detects torque and angular position or orientation and is capable of wireless transmission of detected data to a remote electronic device for subsequent application and management.

2. The Related Arts

A torque wrench is widely used in assembling and maintenance operations of mechanical engineering for tightening or loosening threaded fasteners, such as nuts, attached to a machine or a mechanical part. However, for high precision machinery, the threaded fasteners must be tightened or loosened by following predetermined operation processes with preset levels of torques. Improper operation of manually applying torque may inadvertently cause damage or breaking of the threaded fasteners or threaded holes, and may thus lead to undesired damage to the functionality and operation precision of the machine. The conventional torque wrenches are not capable of detecting and displaying the value of a torque in real time manner when the torque is applied in an operation, whereby a user cannot get aware of the level of torque applied and must thus depend on his or her experience and discretion to operate the hand tool or electric or pneumatic tool. This may lead to improper application of torque due to human errors in applying the torque.

Further, a torque wrench often needs to be held in a particular horizontal angle in the operation thereof. If the wrench or the wrench socket is not set at a desired proper horizontal angle, a bolt or a nut that is being tightened may be damaged by breaking the thread thereof. Heretofore, a skilled operator relies completely upon his or her experience to control the horizontal angle and effective management and alarm may be not realized.

In this respect, torque wrenches with torque sensors and/or angle sensors and displaying and alarming devices are available in the market, which may improve, to some extents, the problems of displaying of torque and alarming found in the operation of a torque wrench. However, control and management of application of torque may not be actually performed if the devices of displaying or alarming get malfunctioning or an operator intentionally ignores the message or reading generated by these devices. This is especially true for a large workshop, such as large-size machine assembling shop and an automobile factory, where a number of work stations are set up and a number of operators work in these work stations, for the management and control of proper operation of the torque wrenches with proper application of torque becomes extremely difficult and such control is only performed on the torque application devices and alarming devices of each individual operator. This makes the industrial of these devices very low.

Other prior art references in this field are also known. For example, Taiwan Patent No. 1300027 discloses a torque wrench having a driving head that is provided with a torque display device, and Taiwan Patent No. 1307305 discloses a digital alarm device for torque wrenches. Both Taiwan patents illustrate conventional solutions that mount torque detection/displaying or alarming devices to torque wrenches for the purposes of realizing detection of torque. However, these known devices are only applicable to torque detection and displaying and alarm detection for individual operator and centralized management and control cannot be made. They are facing the same problem of low industrial value in the applications thereof for no centralized management and control can be made.

In addition, Taiwan Utility Model No. M377299 discloses an angle-measureable torque tool coupler, wherein a torque wrench having a conventional construction is provided with torque/horizontal angle detection, displaying, and alarming for the purposes of realizing detection of angle. However, such a device is only good for personal use in detecting, displaying and issuing alarms associated with torque and horizontal angle. It is not possible for a large workshop to provide centralized control and management in respect of the use of torque wrenches. Thus, economic advantages gained through collective and consistent control and management of the use of torque wrenches cannot be realized.

SUMMARY OF THE INVENTION

In the known torque wrench provided with torque detection and displaying and alarming means, even through displaying and alarming means is provided, such displaying and alarming means may get malfunctioning or is intentionally ignored by a user, making it hard to be applied in an environment where a great number of operators works and thus limiting the applications of the conventional torque wrenches that are provided with torque detection, displaying and alarming means.

To overcome the problems and drawbacks of the conventional devices, the present invention provides a wireless transmission torque wrench with angular orientation correction, comprising at least one wrench body having an end to which a tool head is coupled for coupling with a tool piece, such as wrench socket for application of torque, at least one toque-strain bar, which is coupled to the tool head of the wrench body, at least one torque sensor, which is mounted to the toque-strain bar to detect the value of the torque transmitted to the toque-strain bar, at least one angular position sensor, which is set inside the wrench body to detect a horizontal angle of the wrench body and the tool head, at least one detection and detection and processing circuit, which is arranged in the wrench body and connected to the torque sensor and the angular position sensor to convert the detected torque and angle into digital torque and angle data for displaying or issuing an alarm and to transmit the torque and angle data in a bi-directional wireless manner, and at least one control receiver, which receives the torque and angle data from the detection and detection and processing circuit for subsequent application.

The effectiveness of the wireless transmission torque wrench with angular orientation correction according to the present invention is that besides providing real-time display of precise torque and angle values and alarming operations, a bi-directional wireless transmission is established between a detection and processing circuit and a control receiver to allow the torque value data and angle value data of at least one set of torque wrenches to be remotely transmitted. In other words, the torque and angle values of each of a plurality of torque wrenches can be transmitted in a wireless manner by a detection and processing circuit provided in each torque wrench to a common control receiver and is further applied by the control receiver to a remote electronic device, such as a personal computer, a personal digital assistant, a notebook computer, and the likes, for subsequent applications and management, so as to realize true and precise management of the application of torque and angular positioning by each of the torque wrenches.

BRIEF DESCRIPTION OF THE DRAWINGS

The present invention will be apparent to those skilled in the art by reading the following description of a preferred embodiment thereof, with reference to the attached drawings, wherein.

DETAILED DESCRIPTION OF THE PREFERRED EMBODIMENTS

Figure 1:
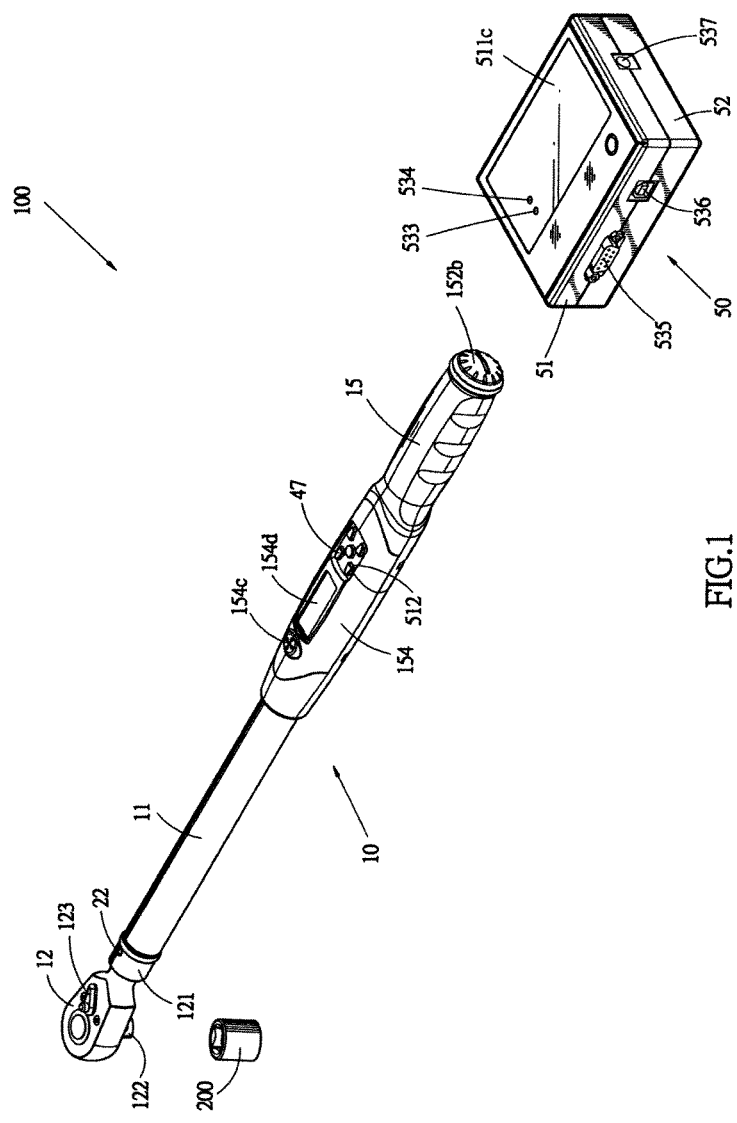
FIG. 1 is a perspective view showing a torque wrench constructed in accordance with a first embodiment of the present invention.
Figure 2:
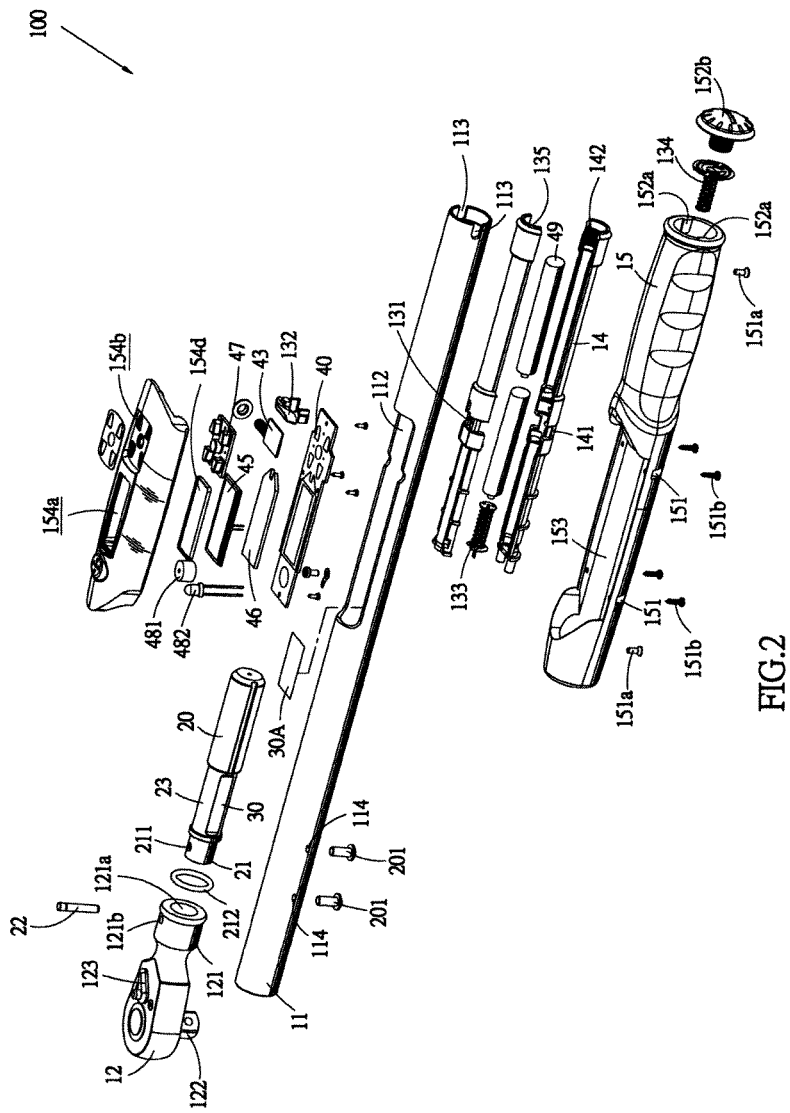
FIG. 2 is an exploded view of the torque wrench in accordance with the present invention.
Figure 3:
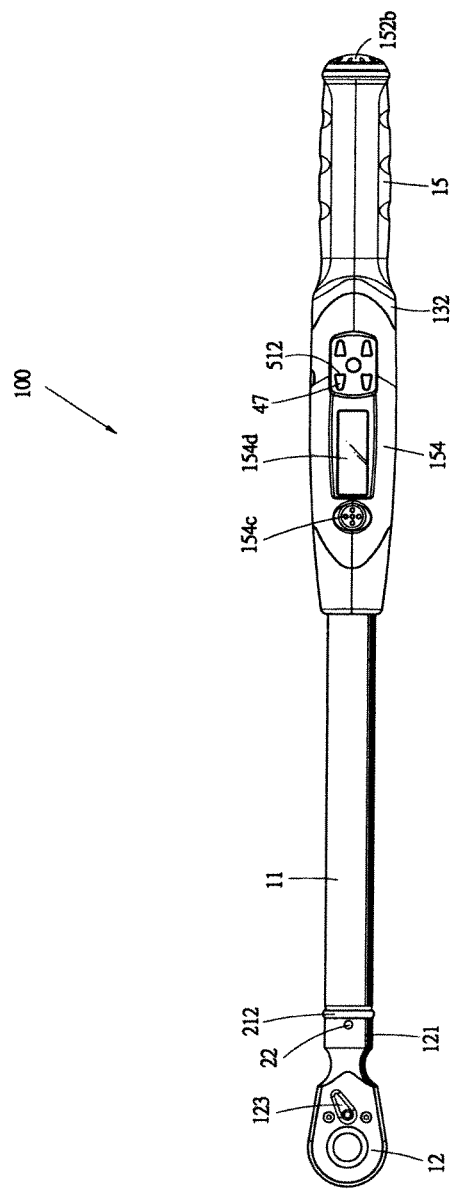
FIG. 3 is a top plan view of FIG. 2.

With reference to the drawings and in particular to FIGS. 1-3, a torque wrench constructed in accordance with a first embodiment of the present invention is shown at 100. The torque wrench 100 comprises a wrench body 10, which comprises a housing 11, a tool head 12, at least two power retention bars 13, 14, and a handle enclosure 15. The housing 11 forms at least one chamber 111 therein. The housing 11 is partially cut off to form a recessed opening 112 in a side wall thereof. The housing 11 also forms a plurality of notches 113 in an end thereof. The housing 11 also forms a plurality of through holes 114 in a bottom portion thereof as viewed in the drawings.

The tool head 12 has an end forming a connection section 121 for connection with an end of the housing 11. The connection section 121 forms therein a bore 121a and also forms a through hole 121b in a surrounding wall thereof. The tool head 12 is provided with a rotation member 122, which is rotatable in a forward direction and/or a reversed direction and is for coupling with a tool piece 200. The tool piece 200 is not limited to any specific form and a wrench socket is taken as an example in the embodiment illustrated. The tool head 12 is further provided with a selection knob 123, which can be manually switched leftward or rightward to set the rotation member 122 to be rotated in the forward direction or the reversed direction.

The power retention bars 13, 14 are received inside the chamber 111 of the housing 11 at an end portion thereof and are set to mate each other in a vertical direction as viewed in the drawings. The power retention bars 13, 14 have surfaces forming positioning troughs 131, 141. A fixation clip 132 is inserted inward from the outside through the opening 112 of the housing 11 to fit into the positioning troughs 131, 141 for fixing the power retention bars 13, 14 inside the housing 11. The mated power retention bars 13, 14 have opposite ends respectively receiving a positive electrode spring 133 and a negative electrode spring 134. The power retention bars 13, 14 form helically arranged teeth 135, 142 in opposing inside surfaces thereof adjacent to an end of the mated power retention bars 13, 14 for collectively forming an internal thread of the mated power retention bars 13, 14.

The handle enclosure 15 comprises a resilient rubber sleeve that is fit over an end portion of the housing 11. The handle enclosure 15 has an outside surface forming a plurality of holes 151 for respectively receiving bolts 151a, 151b extending through a wall of the handle enclosure 15. The handle enclosure 15 forms an end opening 152 in an end thereof. An inside surface of the end opening 152 forms a plurality of projections 152a that are snugly fit into the notches 113 formed in an end of the housing 11 to securely fix the handle enclosure 15 on the end of the housing 11. The end opening 152 receives a bolt 152b that is put in threading engagement with the internal thread of the mated power retention bars 13, 14 formed by the internal teeth 135, 142 to seal the end opening 152. The handle enclosure 15 also forms in the outside surface thereof a recessed opening 153 that corresponds to the recessed opening 112 of the housing 11.

The recessed opening 153 of the handle enclosure 15 receives a surface lid 154 therein. The surface lid 154 forms an opening serving as a display window 154a, a plurality of pushbutton openings 154b, and a plurality of alarm openings 154c. The display window 154a receives and retains a transparent panel 154d therein.

At least one toque-strain bar 20 is provided in an end portion of the chamber 111 of the housing 11 of the body 10. Bolts 201 are respectively received through the through holes 114 defined in the bottom portion of the housing 11 to secure the toque-strain bar 20 inside the housing 11. The toque-strain bar 20 has an end forming a coupling section 21, and a slot 211 is defined in the coupling section 21. The coupling section 21 is fit through a ring 212 to insert into the bore 121a formed in the connection section 121 at one end of the tool head 12 of the body 10 to allow the slot 211 to align with the through hole 121b of the connection section 121. A pin 22 is received through the through hole 121b and the slot 211 to couple the coupling section 21 of the toque-strain bar 20 to the connection section 121 of the tool head 12, whereby the toque-strain bar 20 can detect a torque applied by the rotation member 122 of the tool head 12 of the body 10. The toque-strain bar 20 has an outside surface forming at least one retention section 23.

At least one torque sensor 30 is mounted to the retention section 23 of the toque-strain bar 20 to detect the torque transmitted from the rotation member 122 of the tool head 12 of the body 10 to the toque-strain bar 20 and to convert the torque into an output of torque value signal 31. The torque sensor 30 is not limited to any specific form and a semiconductor based torque strain gauge is taken as an example in the embodiment illustrated.

At least one angular position sensor 30A is set inside the housing 11 of the wrench body 10. The angular position sensor 30A is not limited to any specific form and a gyro integrated circuit bearing a model number ISZ-650 of Invensense series available from Macnica Taiwan Limited is taken as an example herein. The angular position sensor 30A functions to detect a horizontal angle of the body 10 and the tool head 12 and to convert the detected angle into an output of angle value signal 31A.

Figure 4:
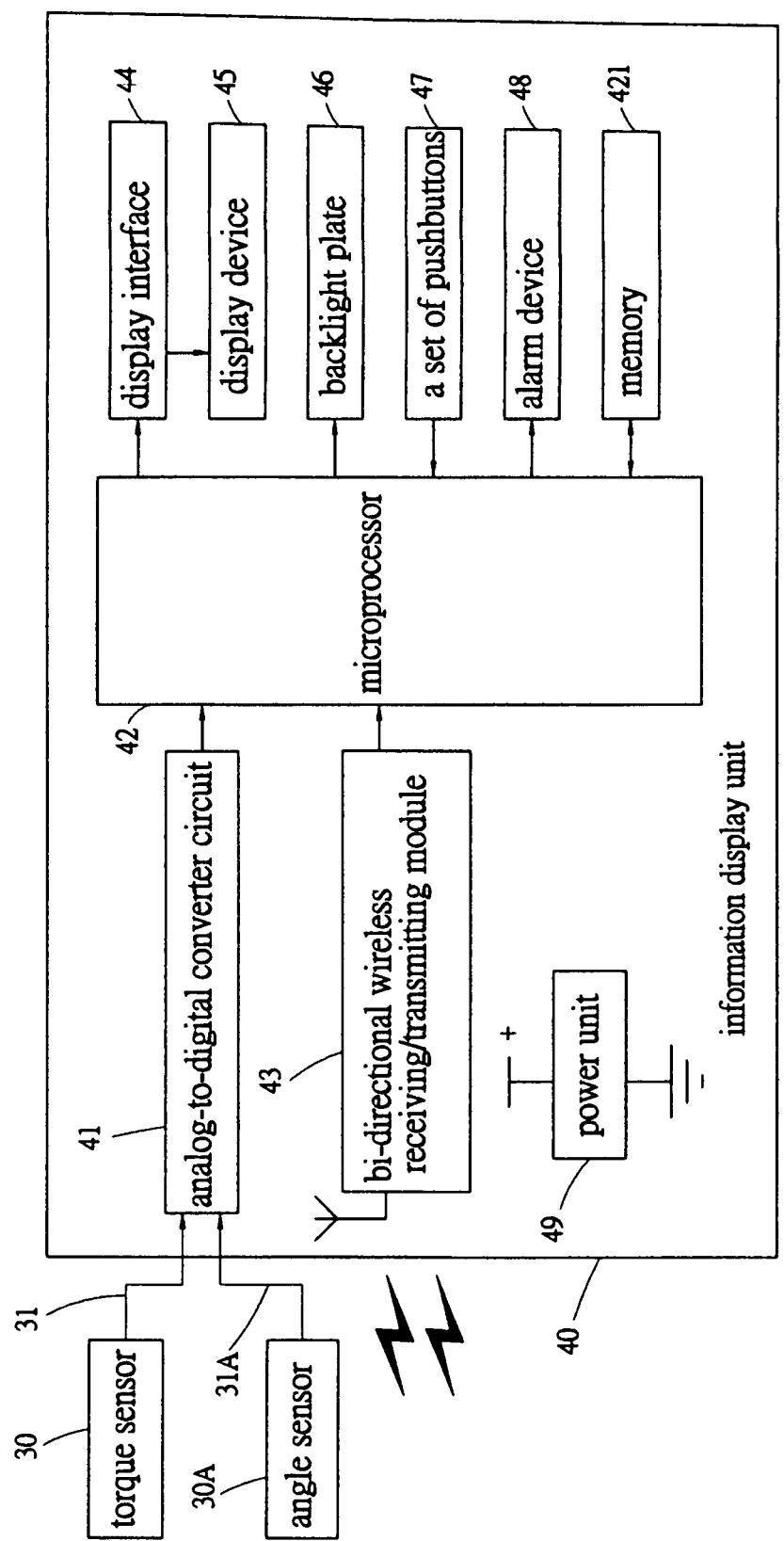
FIG. 4 is a block diagram of a detection and processing circuit of the torque wrench in accordance with the first embodiment of the present invention.

Referring to FIG. 4, at least one detection and processing circuit 40 is received in the opening 112 of the housing 11 of the body 10 and is connected to the torque sensor 30 and the angular position sensor 30A to receive the torque value signal 31 and the angle value signal 31A. The detection and processing circuit 40 also provides the functions of displaying of torque value in the forward direction and/or the reversed direction and the angle value, alarming, storage, tracking of measured torque value and angle value, maintaining of peak torque value, and providing wireless bi-directional transmission and output. The detection and processing circuit 40 is not limited to any specific form and in an embodiment of the present invention, the detection and processing circuit 40 comprises at least an analog-to-digital converter circuit 41, a microprocessor 42, a bi-directional wireless receiving/transmitting module 43, a display interface 44, a display device 45, a backlight plate 46, a set of pushbuttons 47, an alarm device 48, and at least one power unit 49. The analog-to-digital converter circuit 41 is connected to the torque sensor 30 and the angular position sensor 30A to receive and convert the torque value signal 31 and the angle value signal 31A into digital torque value data and digital angle value data for output. The microprocessor 42 is connected to the analog-to-digital converter circuit 41 to receive the digital torque value data and the digital angle value data from the analog-to-digital converter circuit 41. The microprocessor 42 provides the operational functions of control of displaying of torque value in the forward direction and/or the reversed direction and angle value, setting of threshold torque value and angle value, alarming of torque value and angle value, storage of toque value and angle value, and bi-directional wireless transmission of torque value and angle value. The microprocessor 42 is also connected to a memory 421, which functions to store torque values, angle values, a preset threshold torque value, and a preset threshold angle value.

The bi-directional wireless receiving/transmitting module 43 is connected to the microprocessor 42 and provides the function of bi-directional transmission and receiving of data. The bi-directional wireless receiving/transmitting module 43 is controlled by the microprocessor 42 to carry out wireless transmission of the torque value data and the angle value data.

The display interface 44 is connected to the microprocessor 42 to convert the torque value data and the angle value data into a torque value display signal and an angle value display signal. The display device 45 is connected to the display interface 44 to process and then display the torque value display signal and the angle value display signal from the display interface 44. The display device 45 is not limited to any specific form and in an embodiment of the present invention, a liquid crystal display (LCD) is taken as an example of the display device 45. It is noted that other display devices, such as light-emitting diode (LED) based display devices, which show equivalent functions, are deemed within the scope of the present invention. The display device 45 is attached to the transparent panel 154*d* of the display window 154*a* of the surface lid 154 of the handle enclosure 15 (see FIG. 3).

The backlight plate 46 is connected to the microprocessor 42 and is arranged behind the display device 45 to provide backlighting to the display device 45.

The pushbuttons 47 are connected to the microprocessor 42 to provide manual access for the operation of the microprocessor 42 in respect of the functions of displaying, alarming, data input, storage, tracking of measured torque and angle values, maintaining of peak torque value, and providing wireless bi-directional transmission and output, including for example control and operation commands in connection with switching of units of the torque and angle values displayed, such as N-m, ft-lbs, in-lbs, kgf-m, brightness of displaying light from the backlight plate 46, input of threshold torque and angle values for alarming, resetting of alarm, storage of torque and angle values, tracking of measured torque and angle values, maintaining of peak torque value, and providing wireless bi-directional transmission and output of torque and angle values. The pushbuttons 47 are arranged to respectively and partially project beyond the pushbutton openings 154*b* defined in the surface lid 154 of the handle enclosure 15 of the body 10 (see FIG. 3) for manual access and operation.

The alarm device 48 is connected to the microprocessor 42. When a detected value of an applied torque or a detected value of angular position reaches a preset threshold torque value or a preset threshold angle value, the microprocessor 42 activates the alarm device 48 to give off sound and lighting alarms. The alarm device 48 is resettable by operating the pushbuttons 47 in order to shut down the sound and lighting alarms. The alarm device 48 is not limited to any specific form and in an embodiment of the present invention, the alarm device 48 comprises at least a sound alarm element 481 and at least one lighting alarm element 482 (see FIG. 3). The sound alarm element 481 can be for example a buzzer or a loud speaker. The lighting alarm element 482 may comprise one or more light emitting diodes. Thus, the sound alarm element 481 and the lighting alarm element 482 may realize the functions of alarming with sound and lighting. The sound alarm element 481 and the lighting alarm element 482 are respectively received and retained in the alarm openings 154*c* of the surface lid 154 of the handle enclosure 15 to selectively show and give off sound and lighting alarms through the alarm openings 154*c*.

The power unit 49 supplies a working power to the torque sensor 30, the angular position sensor 30A, the analog-to-digital converter circuit 41, the microprocessor 42, the bi-directional wireless receiving/transmitting module 43, the display interface 44, the display device 45, the backlight plate 46, the pushbuttons 47, and the alarm device 48. The power unit 49 is not limited to any specific form, and in an embodiment of the present invention, a direct current (DC) battery is taken as an example of the power unit 49. The power unit 49 is received between the positive electrode spring 133 and the negative electrode spring 134 of the power retention bars 13, 14 of the body 10 whereby positive and negative terminals of the power unit 49 supply electrical power through the positive electrode spring 133 and the negative electrode spring 134 to the torque sensor 30, the angular position sensor 30A, the analog-to-digital converter circuit 41, the microprocessor 42, the bi-directional wireless receiving/transmitting module 43, the display interface 44, the display device 45, the backlight plate 46, the pushbuttons 47, and the alarm device 48.

Figure 5:
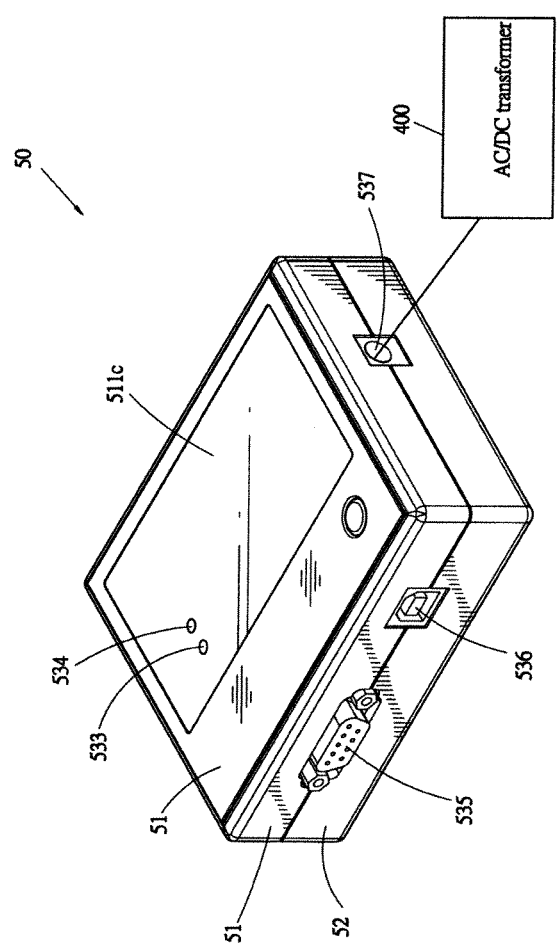
FIG. 5 is a perspective view showing a control receiver of the torque wrench in accordance with the present invention.
Figure 6:
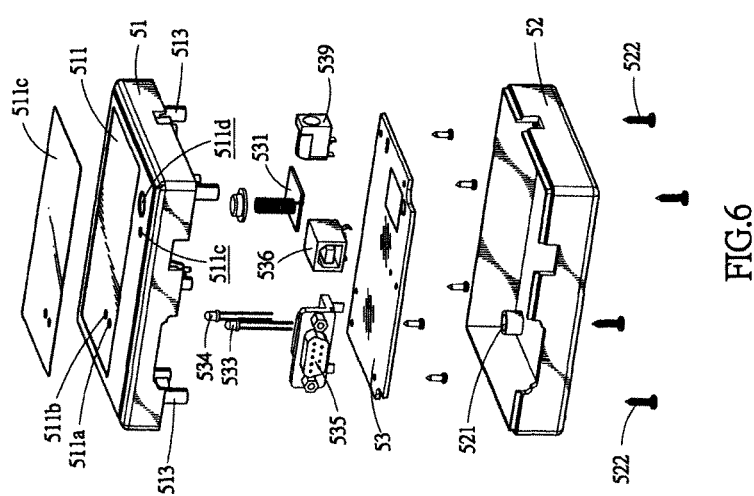
FIG. 6 is an exploded view of the control receiver shown in FIG. 5.
Figure 7:
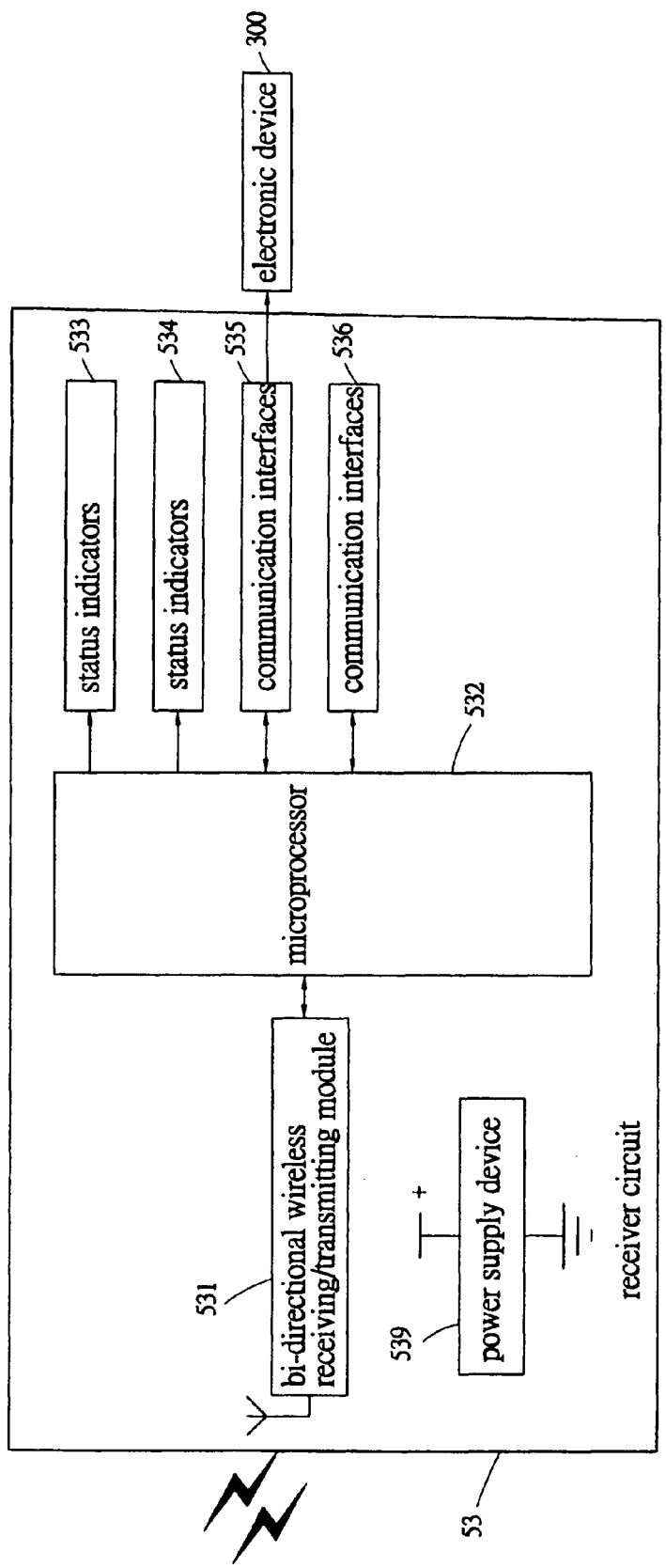
FIG. 7 is a block diagram of a receiver circuit of the control receiver of the torque wrench in accordance with the present invention.

Referring to FIGS. 5-7, at least one control receiver 50 is provided for receiving the torque value data and the angle value transmitted in a wireless manner form the detection and processing circuit 40. The control receiver 50 is connected to at least one external electronic device 300 for transmission of the torque value data and the angle value data to the electronic device 300 that may be located at a remote site. The electronic device 300 is not limited to any specific form and a personal computer is taken as an example. Other personal data processing devices, notebook computers, and industrial computers providing similar functions are deemed within the scope of the present invention.

The control receiver 50 is not limited to any specific form and in an embodiment of the present invention, the control receiver 50 is composed of an upper casing member 51, a lower casing member 52, and at least one receiver circuit 53. The upper casing member 51 forms in an outside surface thereof at least one display zone 511 and a plurality of push-button openings 512. Display holes 511a, 511b, 511c and a fixing hole 511d are defined in or adjacent to the display zone 511. A transparent panel 511e is received in and covers the display zone 511. The upper casing member 51 comprises a plurality of mounting holes 513 formed therein.

The lower casing member 52 forms therein a plurality of through holes 521 corresponding to the mounting holes 513 of the upper casing member 51 for receiving therein bolts 522 to secure the upper and lower casing members 51, 52 together.

The receiver circuit 53 is not limited to any specific form and in an embodiment of the present invention, the receiver circuit 53 comprises a bi-directional wireless receiving/transmitting module 531, a microprocessor 532, status indicators 533, 534, communication interfaces 535, 536, an alert indicator 537, an alerting device 538, and a power supply device 539. The bi-directional wireless receiving/transmitting module 531 receives the torque value data and the angle value data transmitted from the bi-directional wireless receiving/transmitting module 43 of the detection and processing circuit 40. The microprocessor 532 is connected to the bi-directional wireless receiving/transmitting module 531 for controlling transmission and receiving of remote transmission of the torque data value and the angle value received by the bi-directional wireless receiving/transmitting module 531. The status indicators 533, 534 are connected to the microprocessor 532 to be controlled by the microprocessor 532 for indicating the status of wireless transmission of the bi-directional wireless receiving/transmitting module 531 and remote transmission. The status indicators 533, 534 are observable through the display holes 511a, 511b defined in the display zone 511 of the upper casing member 51.

The communication interfaces 535, 536 are connected to the microprocessor 532 and the electronic device 300 to transmit the torque value data and the angle value data received by the microprocessor 532 to the electronic device 300 that are located at a remote site. The communication interfaces 535, 536 are retained between the upper and lower casing members 51, 52. The communication interfaces 535, 536 are not limited to any specific forms and an RS-232 communication interface and a USB (Universal Serial Bus) interface are taken as examples. Other communication interfaces, such as RS-485, that provides the same function, are deemed within the scope of the present invention.

The alert indicator 537 and the alerting device 538 are connected to the microprocessor 532 and are respectively received and retained in the display hole 511c and the fixing hole 511d defined in the upper casing member 51, whereby when the torque value and/or the angle value exceed the preset threshold torque value and/or the preset threshold angle value, the alert indicator 537 is lit and the alerting device 538 gives off sound alert. The alert indicator 537 is not limited to any specific form and may comprise one or more LEDs in an example of the present invention. The alerting device 538 is not limited to any specific form and may comprise a buzzer as an example of the present invention. The alert indicator 537 can be provided for more than one set, or alternatively, a plurality of alert indicators 537 is arranged to form a circle or a rectangle (not shown) for being circulatorily and cyclically turned on and off to give off an alert. Further, the alerting device 538 is not limited to a buzzer and may be arranged to give off other types of sound alerts. All the equivalent sounding and lighting alerting means are considered within the scope of the present invention.

The power supply device 539 is retained between the upper and lower casing members 51, 52 to supply a DC working power to the bi-directional wireless receiving/transmitting module 531, the microprocessor 532, the status indicators 533, 534, the communication interfaces 535, 536, the alert indicator 537 and the alerting device 538. The power supply device 539 is not limited to any specific form and an AC/DC rectification socket is taken as an example in the present invention for external connection with an AC/DC transformer 400 to provide a DC power supply.

Figure 8:
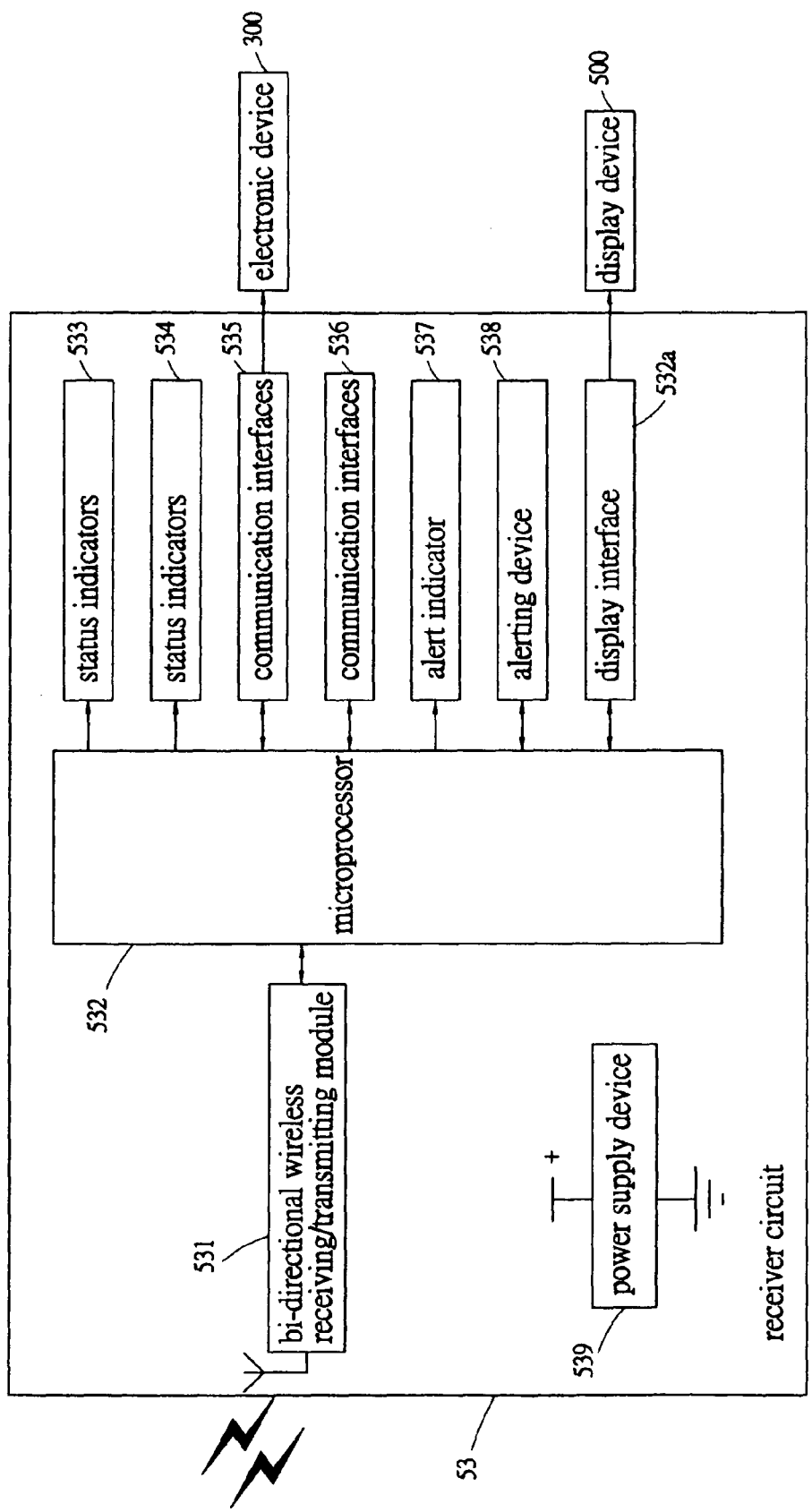
FIG. 8 is a block diagram of a receiver circuit of the control receiver of the torque wrench in accordance with another embodiment of the present invention.

Referring to FIG. 8, another embodiment of the receiver circuit 53 of the control receiver 50 according to the present invention is shown, wherein the microprocessor 532 is connected to a display interface 532a, which is externally connected to a display device 500 to display the torque value and the angle value received by the bi-directional wireless receiving/transmitting module 531 and wireless transmission and working status of remote data transmission performed by the communication interfaces 535, 536.

The bi-directional wireless communication between the bi-directional wireless receiving/transmitting module 43 of the detection and processing circuit 40 and the receiver circuit 53 of the control receiver 50 is not limited to any specific mode and protocol and in an embodiment of the present invention, wireless radio frequency (RF) application is taken as an example. Other modes of wireless transmission and receipt, such as wireless USB, Blue Tooth, infrared (IR), amplitude shift keying (ASK) or frequency shift keying (FSK), are deemed within the scope of the present invention.

Figure 9:
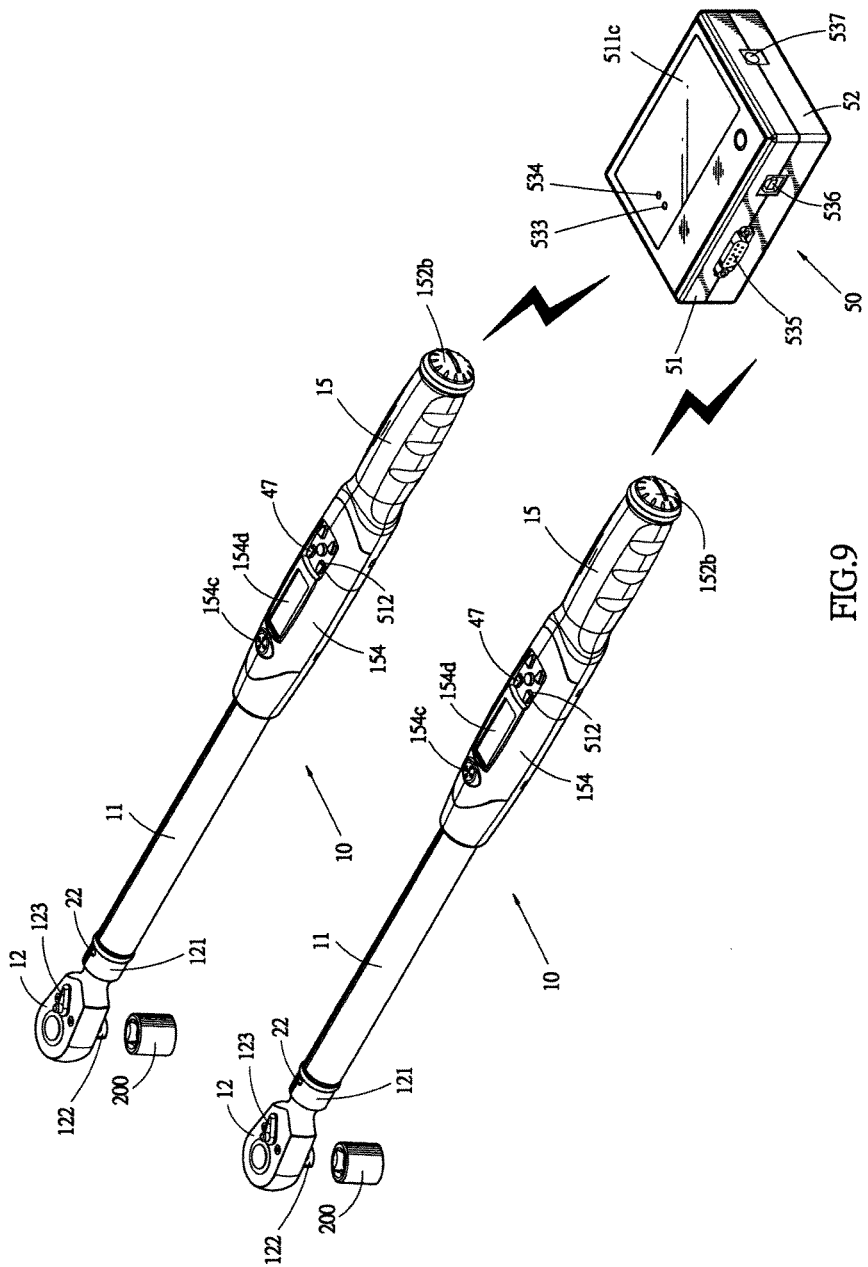
FIG. 9 is a perspective view illustrating an application of the torque wrench of the present invention.

Referring to FIG. 9, an application of the torque wrench 100 according to the present invention is illustrated, wherein multiple wrench bodies 10 are provided, comprising respective detection and processing circuit 40 that transmits the torque value data and the angle value data applied by a tool piece 200 coupled to the tool head 12 of the respective body 10 to the receiver circuit 53 of a common control receiver 50. The control receiver 50 uses the communication interface 535 or 536 to transmit the torque value data and the angle value data to a remote electronic device 300. The detection and processing circuit 40 of each body 10 provides a nearby user with the operation functions of displaying torque value in forward direction or reversed direction and angle value, alarming, data input, storage, tracking of measured torque and angle values, and maintaining of peak torque value, and further, with the bi-directional transmission between each detection and processing circuit 40 and the control receiver 50, the control receiver 50 can apply all the torque value data and the angle value data to the remote electronic device 300 for subsequent application and management.

Figure 10:
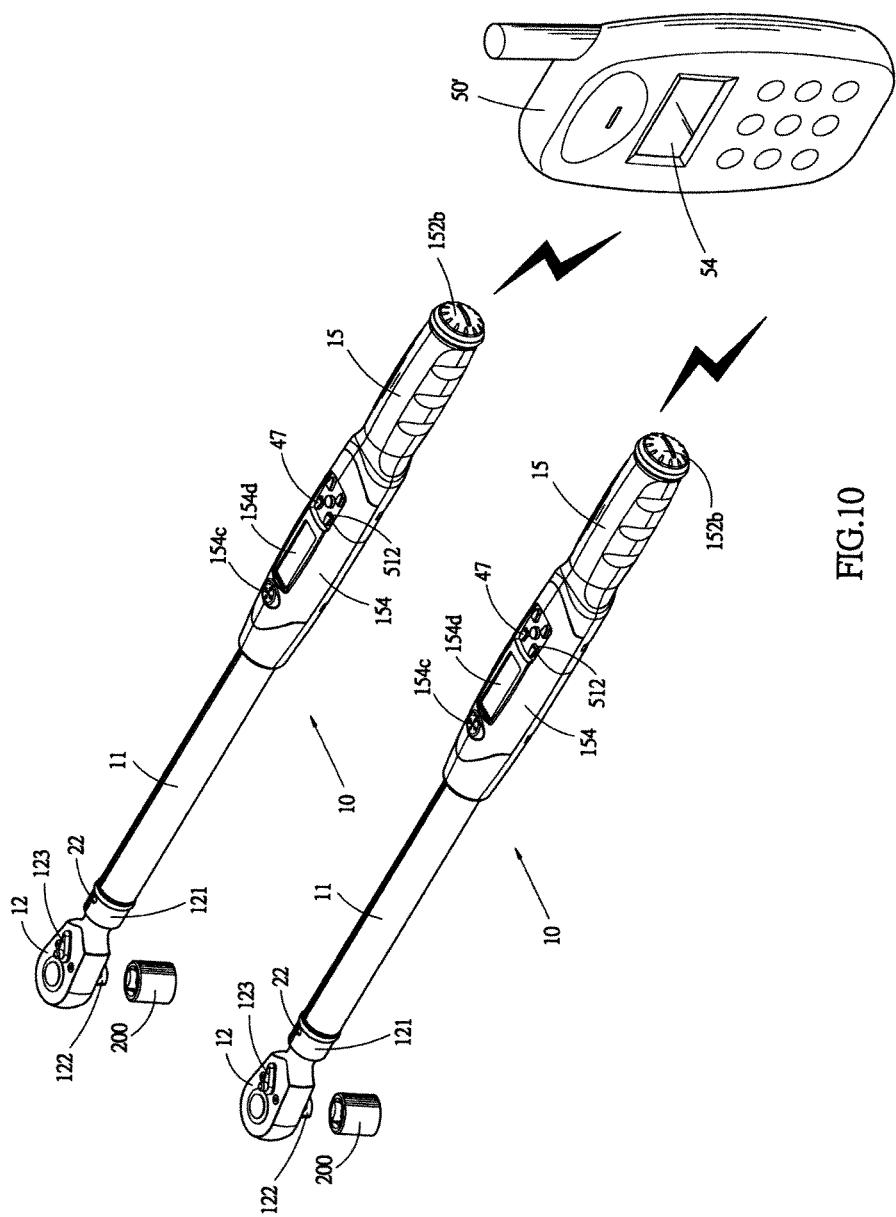
FIG. 10 is a perspective view showing a torque wrench constructed in accordance with a second embodiment of the present invention.

Referring to FIG. 10, a torque wrench constructed in accordance with a second embodiment of the present invention, also designated with reference numeral 100, is shown. In the second embodiment, a control receiver 50' is provided, which is realized with a mobile phone. The control receiver 50' may adopt for example Blue Tooth or wireless local area network protocol to receive the torque value and/or angle value transmitted from the bi-directional wireless receiving/transmitting module 43 of the detection and processing circuit 40. The mobile phone based control receiver 50' has a display screen 54, which displays information related to the torque value and/or the angle value. Further, the mobile phone based control receiver 50' comprises a built-in memory or an attached memory card, which allows for temporary storage of the information related to the torque value and/or the angle value. Further, the mobile phone based control receiver 50' comprises communication functions of short messages and/or e-mails, which transmit the torque value and/or the angle value to a remote electronic device 300 for subsequent use and application.

The torque wrench with wireless transmission function as described above with reference to FIGS. 1-10 provides illustrative examples of the technical solution and measures taken by the present invention and it is noted that the idea of the present invention can be embodied in different forms and is not limited to the description given above. Thus, although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A torque wrench, comprising:
    at least one wrench body, which comprises a tool head that comprises a tool coupling member that is selectively rotatable in a forward direction and a reversed direction;
    at least one toque-strain bar, which is received in the wrench body and has an end coupled to the tool head of the wrench body to receive a torque applied by the tool head;
    at least one torque sensor, which is mounted to a surface of the toque-strain bar to detect value of the torque applied to the toque-strain bar and to convert the torque into a torque value signal;
    at least one angular position sensor, which is set inside the wrench body to detect value of a horizontal angle of the body and the tool head and to convert the detected angle into an angle value signal;
    at least one detection and processing circuit, which is received in the wrench body and is connected to the torque sensor and the angular position sensor to receive the torque value signal and the angle value signal for performing displaying of a torque value and an angle value respectively corresponding to the torque value signal and the angle value signal, alarming, storage in respect of the torque value signal and the angle value signal, and wireless transmission of data of the torque value and the angle value; and
    at least one control receiver, which receive the torque value data and the angle value data from the detection and processing circuit, the control receiver being adapted to connect to an external remote electronic device to apply the received torque value data and the angle value data to the electronic device;
    said wrench body comprises:
    a housing, which forms at least one chamber therein, the housing forming a recessed opening and a plurality of notches, the housing forming a plurality of through holes in a bottom portion thereof;
    a tool head, which has an end forming a connection section for connection with an end of the housing, the connection section comprising a rotation member for coupling with a tool piece;
    at least two power retention bars, which are received in an end portion of the chamber of the housing, a positive electrode spring and a negative electrode spring being received between the two power retention bars in opposite end portions thereof; and
    at least one handle enclosure, which is fit over an end portion of the housing.

2. The torque wrench as claimed in claim 1, wherein the tool head comprises a switch knob.

3. The torque wrench as claimed in claim 1, wherein the toque-strain bar forms a retention section.

4. The torque wrench as claimed in claim 1, wherein the torque sensor comprises a semiconductor based torque strain gauge.

5. The torque wrench as claimed in claim 1, wherein the angular position sensor comprises a gyro integrated circuit.

6. The torque wrench as claimed in claim 1, wherein the wireless transmission between the detection and processing circuit and the control receiver comprises a wireless radio frequency mode.

7. The torque wrench as claimed in claim 1, wherein the wireless transmission between the detection and processing circuit and the control receiver comprises a wireless USB mode.

8. The torque wrench as claimed in claim 1, wherein the wireless transmission between the detection and processing circuit and the control receiver comprises a Blue Tooth mode.

9. The torque wrench as claimed in claim 1, wherein the wireless transmission between the detection and processing circuit and the control receiver comprises a wireless local area network.

10. The torque wrench as claimed in claim 1, wherein the wireless transmission between the detection and processing circuit and the control receiver comprises an infrared mode.

11. The torque wrench as claimed in claim 1, wherein the wireless transmission between the detection and processing circuit and the control receiver comprises an amplitude shift keying mode.

12. The torque wrench as claimed in claim 1, wherein the wireless transmission between the detection and processing circuit and the control receiver comprises a frequency shift keying mode.

13. The torque wrench as claimed in claim 1, wherein the control receiver comprises a mobile phone.

14. A torque wrench, comprising:
    at least one wrench body, which comprises a tool head that comprises a tool coupling member that is selectively rotatable in a forward direction and a reversed direction;
    at least one toque-strain bar, which is received in the wrench body and has an end coupled to the tool head of the wrench body to receive a torque applied by the tool head;
    at least one torque sensor, which is mounted to a surface of the toque-strain bar to detect value of the torque applied to the toque-strain bar and to convert the torque into a torque value signal;
    at least one angular position sensor, which is set inside the wrench body to detect value of a horizontal angle of the body and the tool head and to convert the detected angle into an angle value signal;
    at least one detection and processing circuit, which is received in the wrench body and is connected to the torque sensor and the angular position sensor to receive the torque value signal and the angle value signal for performing displaying of a torque value and an angle value respectively corresponding to the torque value signal and the angle value signal, alarming, storage in respect of the torque value signal and the angle value signal, and wireless transmission of data of the torque value and the angle value; and
    at least one control receiver, which receive the torque value data and the angle value data from the detection and processing circuit, the control receiver being adapted to connect to an external remote electronic device to apply the received torque value data and the angle value data to the electronic device;

the detection and processing circuit comprises:
at least one analog-to-digital converter circuit, which is connected to the torque sensor and the angular position sensor to receive and convert the torque value signal and the angle value signal into digital torque value data and angle value data;
at least one microprocessor, which is connected to the analog-to-digital converter circuit to receive the torque value data and the angle value data from the analog-to-digital converter circuit, the microprocessor providing functions of control of display of torque in forward direction or reversed direction and angle value, setting a threshold torque value and a threshold angle value, alarming of torque and angle values, storage of torque and angle values, and bi-directional wireless transmission of torque and angle values;
at least one bi-directional wireless receiving/transmitting module, which is connected to the microprocessor, the bi-directional wireless receiving/transmitting module providing functions of bi-direction transmission and receipt of data and being controlled by the microprocessor to transmit the torque value data and the angle value data in a wireless manner;
at least one display interface, which is connected to the microprocessor to convert the torque value data and the angle value data into a torque value display signal and an angle value display signal;
a display device, which is connected to the display interface to process and then display the torque value display signal and the angle value display signal from the display interface;
a backlight plate, which is connected to the microprocessor to provide backlighting to the display device;
a group of pushbuttons, which is connected to the microprocessor to provide manual access for operations of the microprocessor in respect of displaying, alarming, data input, storage, tracking of measured torque and angle values, maintaining of peak torque value, and providing wireless bi-directional transmission and output;
at least one alarm device, which is connected to the microprocessor to be actuated by the microprocessor to give off sound and lighting alarms at the time when a detected value of torque or angle reaches a preset threshold torque value or a preset threshold angle value; and
at least one power unit, which supplies working power to the torque sensor, the angular position sensor, the analog-to-digital converter circuit, the microprocessor, the bi-directional wireless receiving/transmitting module, the display interface, the display device, the backlight plate, the pushbuttons, and the alarm device.

15. The torque wrench as claimed in claim 14, wherein the microprocessor is connected to a memory.

16. The torque wrench as claimed in claim 14, wherein the power unit comprises a DC battery.

17. A torque wrench, comprising:
at least one wrench body, which comprises a tool head that comprises a tool coupling member that is selectively rotatable in a forward direction and a reversed direction;
at least one toque-strain bar, which is received in the wrench body and has an end coupled to the tool head of the wrench body to receive a torque applied by the tool head;
at least one torque sensor, which is mounted to a surface of the toque-strain bar to detect value of the torque applied to the toque-strain bar and to convert the torque into a torque value signal;
at least one angular position sensor, which is set inside the wrench body to detect value of a horizontal angle of the body and the tool head and to convert the detected angle into an angle value signal;
at least one detection and processing circuit, which is received in the wrench body and is connected to the torque sensor and the angular position sensor to receive the torque value signal and the angle value signal for performing displaying of a torque value and an angle value respectively corresponding to the torque value signal and the angle value signal, alarming, storage in respect of the torque value signal and the angle value signal, and wireless transmission of data of the torque value and the angle value; and
at least one control receiver, which receive the torque value data and the angle value data from the detection and processing circuit, the control receiver being adapted to connect to an external remote electronic device to apply the received torque value data and the angle value data to the electronic device;
the control receiver comprises a receiver circuit that comprises:
at least one bi-directional wireless receiving/transmitting module, which receives the torque value data and the angle value data transmitted in a wireless manner from the detection and processing circuit;
at least one microprocessor, which is connected to the bi-directional wireless receiving/transmitting module for performing transmission/receipt operation to transmit the torque value data and the angle value data received from the bi-directional wireless receiving/transmitting module to the remote electronic device;
at least one status indicator, which is connected to the microprocessor to be controlled by the microprocessor to indicate status of wireless transmission of the bi-directional wireless receiving/transmitting module and remote data transmission;
at least one communication interface, which is connected to the microprocessor and the electronic device to transmit the torque value data and the angle value data received by the microprocessor to the remote electronic device; and
at least one power supply device, which supplies a DC working power to the bi-directional wireless receiving/transmitting module, the microprocessor, the status indicator, and the communication interface.

18. The torque wrench as claimed in claim 17, wherein the communication interface comprises an RS-232 communication interface.

19. The torque wrench as claimed in claim 17, wherein the communication interface comprises a USB interface.

20. The torque wrench as claimed in claim 17, wherein the communication interface comprises an RS-485 communication interface.

21. The torque wrench as claimed in claim 17, wherein the power supply device comprises an AC/DC rectification socket.

22. The torque wrench as claimed in claim 17, wherein the microprocessor is connected to at least one alert indicator.

23. The torque wrench as claimed in claim 22, wherein the alert indicator comprises a light-emitting diode.

24. The torque wrench as claimed in claim 17, wherein the microprocessor is connected to at least one alerting device.

25. The torque wrench as claimed in claim 24, wherein the alerting device comprises a buzzer.

* * * * *

UNITED STATES PATENT AND TRADEMARK OFFICE
CERTIFICATE OF CORRECTION

PATENT NO. : 8,443,703 B2　　　　　　　　　　　　　　　　　　　　　　　Page 1 of 1
APPLICATION NO. : 13/017246
DATED : May 21, 2013
INVENTOR(S) : Chiang Kao Chen It is certified that error appears in the above-identified patent and that said Letters Patent is hereby corrected as shown below:

TITLE PAGE ITEM [73]: DELETE THE ASSIGNEE NAME "LIFESTYLE PRODUCTS CORP."
AND INSERT --LEGEND LIFESTYLE PRODUCTS CORP.--

Signed and Sealed this
Second Day of July, 2013

Teresa Stanek Rea
*Acting Director of the United States Patent and Trademark Office*